3,393,129
METHOD FOR PRODUCING d-BIOTIN

Motoo Shibata, Toyonaka, Toru Hasegawa, Osaka, Eiji Higashide, Takarazuka, Komei Mizuno, Suita, and Yukihiko Kameda, Nishinomiya, Japan, assignors to Takeda Chemical Industries, Ltd., Osaka, Japan
No Drawing. Filed Dec. 20, 1965, Ser. No. 515,189
Claims priority, application Japan, Dec. 23, 1964, 39/72,967
10 Claims. (Cl. 195—28)

This invention relates to a method for the production of d-biotin on an industrial scale by the use of microorganisms.

It is well known that certain microorganisms, e.g., *Mycobacterium tuberculosis, Bacillus subtilis, Aerobacter aerogenes, Pseudomonas aeruginosa, Azotobacter vinelandii, Aspergillus niger, Mucor ramannianus, Rhizopus suinus, Fusarium niveum, Phytophthora gonapoides*, etc., are capable of accumulating in their culture broth substances having a biotinic type biological action. However, biotinic substances accumulated by those microorganisms cannot be clearly identified as d-biotin per se, since the amount of the substances accumulated in their culture broth is very small, and the accumulation is confirmed only by microbiological assay employing *Lactobacillus arabinosus* and/or *Saccharomyces cerevisiae* in which d-biotin analogs such as desthiobiotin and biotin l-sulfoxide show similar activity to d-biotin. As far as the present inventors are aware it has never been reported that d-biotin per se is obtained from the culture broth of microorganisms. The present invention has been accomplished on the basis of the following findings:

(1) There are microorganisms capable of accumulating d-biotin in their culture broth in such a quantity that it can be recovered therefrom in a desired purity.

(2) The microorganisms capable of accumulating d-biotin belong to the genus Sporobolomyces, and (3) The above-mentioned microorganisms are capable of accumulating a remarkably enhanced amount of d-biotin when cultivated in a culture medium containing azelaic acid.

The object of the present invention is to provide a method for fermentative production on an industrial scale of d-biotin.

Another object of the present invention is to provide d-biotin in sufficient quantity to be used as, for example, medicine or feed for fishes. When employed to feed fishes, d-biotin need not be purified by way of crystallization.

When the present invention is actually carried out, microorganisms belonging to the genus Sporobolomyces and capable of producing d-biotin are employed. These microorganisms comprise, for example, (a) *Sporobolomyces pararoseus* Olson et Hammer, (b) *Sporobolomyces salmonicolor* Kluyver et van Niel, (c) *Sporobolomyces carnicolor* Yamazaki et Fujii and (d) mutants and variants thereof.

Mutants and variants of *Sporobolomyces pararoseus* Olson et Hammer, *Sporobolomyces salmonicolor* Kluyver et van Niel and *Sporobolomyces carnicolor* Yamazaki et Fujii, regardless of whether the variation is a spontaneous one or is artificially produced, for example with X-ray, ultraviolet-ray or by the action of chemical reagents, can be employed as far as they are capable of producing d-biotin.

In the present invention, a d-biotin-producing-strain belonging to the genus Sporobolomyces is incubated in a medium containing assimilable carbon sources, digestible nitrogen sources, sulfur sources and other nutrients necessary for the growth of the microorganism. As the carbon sources, there can be employed, for example, glucose, starch, lactose, maltose, galactose, sucrose, dextrin, glycerol or millet jelly. As the nitrogen sources, for example, peptone, soybean powder, corn steep liquor, meat extract, ammonium salts, organic or inorganic nitrogen-containing material can be employed. As the sulfur sources, for example, sodium sulfate, ammonium sulfate, cystine, cystein, methionine, thioglycollic acid, thiomalic acid, thiourea, lipoic acid, thianuric acid or thiocyanogen, organic or inorganic sulfur-containing material can be employed. Further a small quantity of inorganic salts, such as sodium chloride, phosphate salts of metals such as calcium, zinc, manganese, iron can be added to the medium. And, if necessary, conventional nutrient factors or an antifoaming agent, such as animal oil, vegetable oil or mineral oil can also be added supplementarily.

This invention also comprises the use of azelaic acid in the culture medium in which a d-biotin-producing-strain belonging to the genus Sporobolomyces is cultured, whereby the accumulation of d-biotin can be remarkably enhanced. The comparative data of the yield of d-biotin accumulated in the culture broth, when e.g., *Sporobolomyces carnicolor* Yamazaki et Fujii is cultured in an azelaic acid-containing medium and when the incubation is carried out in a culture medium which does not contain azelaic acid, are shown in Table 1. The aqueous culture media employed in the respective incubations are in a volume of 50 milliliters containing 5.0% of sucrose, 5.0% of glucose, 1.0% of soybean flour, 0.1% of sodium aspartate, 0.3% of $K_2HPO_4$, 0.01% of $MgSO_4$, 1.0% of $CaCO_3$ and azelaic acid in the respective amounts described in Table 1 under shawing at 28° C. for 5 days or 7 days. Each culture broth is filtered, and the filtrate is subjected to assay employing *Lactobacillus arabinosus*. (The percentages are weight/volume.)

TABLE 1

| Period of incubation (days) | Yield of d-biotin (mγ/ml.) | |
|---|---|---|
| | 5 | 7 |
| Addition rate of azelaic acid (percent): | | |
| 0 (contrast) | 270 | 400 |
| 0.002 | 680 | 970 |
| 0.005 | 630 | 1,300 |
| 0.01 | 680 | 1,150 |
| 0.02 | 560 | 1,450 |

Mγ/ml.=milligamma per milliliter.

As is clear from Table 1, a d-biotin-producing-strain belonging to the genus Sporobolomyces is capable of accumulating a remarkably enhanced amount of d-biotin when it is cultured in a medium containing azelaic acid. As the source of azelaic acid, there may be employed azelaic acid itself or its salts, e.g., sodium azelate, potassium azelate, ammonium azelate, calcium azelate, etc., and/or its anhydride. The optimum concentration of azelaic acid in the culture medium is between about 0.001% and 0.05% (weight/volume) as free acid in view of the yield of d-biotin.

For the culture of a d-biotin-producing-strain, submerged culture is preferable. But, as occasion demands, shake culture can be employed. The culture conditions such as temperature, culture period and pH of the medium should be established so as to make the production of d-biotin maximum. When submerged culture is employed, the production of d-biotin becomes maximum generally under such culture conditions as at a temperature of 25° C. to 40° C., at a pH value of about 5.0 to about 7.0 and for about 2 to 10 days.

d-Biotin thus accumulated in the culture broth is recovered and refined in a desired purity by utilizing appropriate means with adequate consideration given to the properties of d-biotin, for example, differences between d-biotin and impurities in solubility, in distribution coefficient between two liquid phases, in adsorbability or in ion-coherence. For example, such means as adsorption-, partition- or ion-exchange-chromatography, counter-current distribution or recrystallization are preferably employed for the recovery of d-biotin.

The following examples set forth presently-preferred exemplary embodiments of the present invention; these are intended to be solely illustrative, however, and not at all limitative of the invention.

Throughout the present specification, the abbreviations, mγ, γ, mg., kg., ml., ° C. and N refer to milligamma, gamma, milligram, kilogram, milliliter, and degree centigrade and normal, respectively, and percentages are in weight per volume unless otherwise noted.

EXAMPLE 1

3 liters of aqueous culture medium (pH 7.0) containing 5.0% of sucrose, 5.0% of glucose, 1.0% of soy bean flour, 2.0% of yeast extract, 0.1% of sodium asparaginate, 0.3% of dipotassium hydrogenphosphate, 0.1% of magnesium sulfate (7 hydrate) and 1.0% of calcium carbonate is inoculated with *Sporobolomyces pararoseus* Olson et Hammer (ATCC 16405), and maintained at 28° C. for 48 hours under shaking. The incubated inoculum is added to 500 liters of aqueous culture medium of the same composition as above in a stainless steel fermenter. Incubation is conducted at 28° C. for 7 days under aeration and agitation, followed by adjusting the pH to 3.0 with sulfuric acid. To thus-obtained culture broth is added 15 kg. of a commercially available filter aid, then the mixture is subjected to filtration to obtain 400 liters of filtrate which shows d-biotin activity of 450 mγ per ml. against *Lactobacillus arabinosus*. The filtrate is passed through a column (20 centimeters in diameter and 75 centimeters in height) packed with 20 liters of activated charcoal. The column is washed with 400 liters of water, followed by elution of the object substance with 200 liters of 0.1 N-aqueous ammonia. The effluent is concentrated in vacuo to obtain 14 liters of solution showing d-biotin activity of 4600 mγ per ml. against *Lactobacillus arabinosus*. To the solution is added 16 liters of a 1:10 aqueous dilution of a commercially available coagulating agent (Konanflock No. 100, Konan Kagaku Kabushiki Kaisha, Japan) little by little under shaking. After the mixture is kept standing for 1 hour, 0.8 kg. of a commercially available filter aid is added to the mixture, followed by subjecting the whole mixture to filtration to obtain 35 liters of filtrate showing d-biotin activity against *Lactobacillus arabinosus*. The filtrate is passed through a column (15.5 centimeters in diameter and 53 centimeters in height) packed with 10 liters of strongly basic anion exchange resin (hydroxyl type, such as Dowex 1 x 8, Dow Chemical Co., U.S.A.). The column is washed with 40 liters of water, followed by elution of the object substance with 1 N-acetic acid solution to obtain 150 liters of effluent showing d-biotin activity against *Lactobacillus arabinosus*. The effluent is concentrated in vacuo to obtain 260 ml. of solution showing d-biotin activity of 175,000 mγ per ml. against *Lactobacillus arabinosus*. The solution is passed through a column (10.0 centimeters in diameter, and 46 centimeter in height) packed with 3 liters of strongly acid cation exchange resin (H type, such as Dowex 50W x 8, Dow Chemical Co., U.S.A.). The column is subjected to elution with 100 liters of water to obtain 75 liters of effluent showing d-biotin activity. The effluent is concentrated in vacuo to obtain 30 ml. of solution showing d-biotin activity of 1,150,000 mγ per ml. against *Lactobacillus arabinosus*, and then the solution is passed through a column (3 centimeters in diameter, and 60 centimeters in height) packed with 300 ml. of activated charcoal. The column is subjected to elution with 0.1 N-aqueous ammonia to obtain 2.8 liters of effluent showing d-biotin activity. The effluent is concentrated in vacuo to leave 130 ml. of solution showing d-biotin activity of 200,000 mγ per ml. against *Lactobacillus arabinosus*. The solution is passed through a column (2 centimeters in diameter and 60 centimeters in height) packed with 100 ml. of strongly acid cation exchange resin (H type, such as Dowex 50W x 8, Dow Chemical Co., U.S.A.). The column is subjected to elution with 5 liters of water to obtain 1100 ml. of effluent showing d-biotin activity of 35,000 mγ per ml. against *Lactobacillus arabinosus*. The effluent is concentrated in vacuo to leave 600 mg. of residue showing 49.5γ per mg. against *Lactobacillus arabinosus*.

1.2 g. of the residue obtained by repeating the above-mentioned processes of incubation and purification is subjected to counter-current distribution extraction (150 steps) employing a mixture solution of n-butanol, acetic acid and water (5:0.1:5 by volume) to obtain 400 ml. of a fraction showing d-biotin activity, and then the said fraction is concentrated in vacuo to leave about 40 mg. of residue. The residue is dissolved in 3 ml. of 0.1 N-sodium hydroxide, and then the mixture is subjected to filtration. After adjusting to pH 3.0 with the addition of 0.05 N-hydrochloric acid solution, the filtrate is kept standing in a cool place overnight. The resultant precipitates are collected by filtration and air-dried below 40° C. in vacuo to obtain 30 mg. of white needles. Thus-obtained needles are in good agreement with an authentic sample of d-biotin (New National Biochemicals Co., U.S.A.), for example, in melting point, elementary analysis and infra-red spectrum, and show d-biotin activity of 103%–105% relative to the d-biotin activity of the said d-biotin sample. The needles are thus identified to be d-biotin.

EXAMPLE 2

*Sporobolomyces pararoseus* Olson et Hammer (ATCC 16405) is incubated in 500 liters of aqueous culture medium of the same composition as employed in Example 1, except the addition of 0.005% of azelaic acid after the manner described in Example 1. Thus-obtained culture broth is filtered in the same manner as in Example 1 to obtain 400 liters of filtrate showing d-biotin activity of 1,550 mγ per ml. against *Lactobacillus arabinosus*. The filtrate is treated as described in Example 1 to obtain 55 mg. of d-biotin as needles.

EXAMPLE 3

*Sporobolomyces salmonicolor* Kluyver et van Niel (ATCC 16406) incubated in 500 liters of aqueous culture medium of the same composition as employed in Example 1 at 28° C. for 7 days under aeration and agitation to obtain culture broth showing d-biotin activity of 380 mγ per ml. against *Lactobacillus arabinosus*. Thus-obtained culture broth is treated after the manner described in Example 1 to obtain 11 mg. of d-biotin as needles.

EXAMPLE 4

*Sporobolomyces salmonicolor* Kluyver et van Niel (ATCC 16406) is incubated in 500 liters of aqueous culture medium of the same composition as employed in Example 3 except for the addition of 0.005% of azelaic acid after the manner described in Example 3 to obtain culture broth showing d-biotin activity of 1,350 mγ per ml. against *Lactobacillus arabinosus*. The culture broth is treated as described in Example 1 to obtain 52 mg. of d-biotin as needles.

EXAMPLE 5

*Sporobolomyces carnicolor* Yamazaki et Fugii (ATCC 16507) is incubated in 500 liters of aqueous culture medium of the same composition as employed in Example 1 except for the addition of 0.005% of azelaic acid, at 30° C. for 6 days under aeration and agitation. To thus-obtained culture broth is added 1,000 liters of water, and then the aqueous mixture is adjusted to pH 2.2 with sulfuric acid, then heated at 95° C. for 30 minutes, followed by the addition of 45 kg. of a commercially available filter aid. The whole mixture is subjected to filtration to obtain 1400 liters of filtrate which shows d-biotin activity of 1.6γ per ml. against *Lactobacillus arabinosus*.

The filtrate is passed through a column (22 centimeters in diameter and 120 centimeters in height) packed with 45 liters of activated charcoal. The column is washed with 400 liters of water, and then eluted with 1,600 liters of 0.1 N-aqueous ammonia. Thus-obtained effluent showing d-biotin activity of 1,000γ per ml. against *Lactobacillus arabinosus* is passed through a column (22 centimeters in diameter and 120 centimeters in height) packed with 45 liters of strongly basic anion exchange resin (hydroxyl type, such as Amberlite IRA–402, Rohm & Haas Co., U.S.A.). The column is washed with 400 liters of water, and then eluted with 1 N-acetic acid solution to obtain 800 liters of effluent showing d-biotin activity of 2.22γ per ml. against *Lactobacillus arabinosus*. The effluent is concentrated in vacuo to make the total volume 2.4 liters and then the concentrated solution is passed through a column (20 centimeters in diameter and 85 centimeters in height) packed with 27 liters of strongly acid cation exchange resin (H type, such as Dowex 50W x 8, Dow Chemical Co., U.S.A.). The column is subjected to elution with 1500 liters of water to obtain two fractions respectively showing d-biotin activity against *Lactobacillus arabinosus*. Thus-obtained two fractions are respectively subjected to paper chromatography employing a mixture solution of n-butanol, acetic acid and water (4:1:5 by volume) as solvent system. The first fraction (150 liters) is identified to be the fraction of biotin l-sulfoxide, since its R*f* value (0.40–0.43) is equal to that of biotin l-sulfoxide, and the second fraction (1350 liters) is identified to be the fraction of d-biotin since its R*f* value (0.82–0.86) is equal to that of d-biotin. Thus-obtained fraction of d-biotin is concentrated in vacuo to give 51.2 g. of residue showing d-biotin activity of 29γ per mg. against *Lactobacillus arabinosus*. The residue is subjected to counter-current distribution extraction (10 steps) employing a mixture solution of n-butanol, acetic acid and water (5:0.15:5 by volume) to obtain 6 liters of d-biotin fraction, and then the fraction is concentrated in vacuo to give 3.8 g. of crude d-biotin powder showing d-biotin activity of 300γ per mg. against *Lactobacillus arabinosus*. The crude powder is dissolved in 50 ml. of water, followed by the adjustment of its pH to 7.0 with 2 N-sodium hydroxide, and then the solution is subjected to filtration. The filtrate is passed through a column (5 centimeters in diameter and 120 centimeters in height) packed with 2.5 liters of strongly basic anion exchange resin (acetic acid type, such as Dowex 1 x 8, Dow Chemical Co., U.S.A.). The column is washed with 5 liters of water, and subjected to elution with 0.3 N-acetic acid solution to obtain 10 liters of d-biotin fraction. The d-biotin fraction is concentrated in vacuo to give 548 mg. of residue showing d-biotin activity of 800γ per mg. against *Lactobacillus arabinosus*. The residue is dissolved in 50 ml. of 0.1 N-sodium hydroxide solution, followed by filtration. After the filtrate is adjusted to pH 3 with 0.05 N-hydrochloric acid, it is kept standing in a cool place overnight. The resultant precipitates are collected by filtration and air-dried below 40° C. in vacuo to obtain 360 mg. of d-biotin as needles.

EXAMPLE 6

*Sporobolomyces carnicolor* Yamazaki et Fujii (ATCC 16407) is incubated in 500 liters of aqueous culture medium of the same composition as employed in Example 5, except lack of azelaic acid, after the manner described in Example 5 to obtain culture broth showing d-biotin activity of 600 mγ per ml. against *Lactobacillus arabinosus*. The culture broth is treated as described in Example 5 to obtain 21 mg. of d-biotin as needles.

Having thus disclosed the invention, what is claimed is:

1. A method for producing d-biotin, which comprises incubating a d-biotin-producing strain belonging to the genus Sporobolomyces in a nutrient-containing medium until d-biotin is substantially accumulated in the culture broth, and recovering the accumulated d-biotin therefrom.

2. A method according to claim 1, wherein the incubation is carried out in a medium at a pH value of about 5.0 to 7.0 and containing assimilable carbon sources, digestible nitrogen sources, sulfur sources and other nutrients necessary for the growth of the microorganism, at a temperature of about 25° C. to about 40° C. under aerobic conditions.

3. A method according to claim 2, wherein the medium contains azelaic acid.

4. A method according to claim 2, wherein the medium contains between about 0.001% and 0.05% (weight/volume) of azelaic acid.

5. A method according to claim 2, wherein the d-biotin-producing strain is *Sporobolomyces pararoseus* Olson et Hammer.

6. A method according to claim 2, wherein the d-biotin-producing strain is *Sporobolomyces salmonicolor* Kluyver et van Niel.

7. A method according to claim 2, wherein the d-biotin-producing strain is *Sporobolomyces carnicolor* Yamazaki et Fujii.

8. A method according to claim 4, wherein the d-biotin-producing strain is *Sporobolomyces pararoseus* Olson et Hammer.

9. A method according to claim 4, wherein the d-biotin-producing strain is *Sporobolomyces salmonicolor* Kluyver et van Niel.

10. A method according to claim 4, wherein the d-biotin-producing strain is *Sporobolomyces carnicolor* Yamazaki et Fujii.

No references cited.

ALVIN E. TANENHOLTZ, *Primary Examiner.*